Patented Mar. 10, 1942

2,275,836

UNITED STATES PATENT OFFICE 2,275,836

AGENT AND PROCESS FOR THE CONVERSION OF STARCH CONTAINING MATERIALS

Erich Briess, New York, N. Y.

No Drawing. Application April 10, 1940, Serial No. 328,880

3 Claims. (Cl. 195—20)

My invention relates to a new preparation for use in the conversion of starch containing materials, as for instance mashes or doughs, and to a new process of converting starch containing materials for subsequent fermentation of the converted materials with yeast.

Heretofore, the sugar conversion of mashes or the like was, for all practical purposes, effected with the help of agents consisting exclusively of malts and diastase containing malt products.

One object of my invention is to produce a new conversion stimulating agent which is considerably less expensive than the preparations used heretofore for this purpose.

Another object of my invention is to produce an inexpensive conversion stimulating agent which, in mixture with the starch containing material, stimulates the fermentation of the latter with yeast in such a manner that the fermentation results, in yield as well as in quality, are at least equal and in some cases even superior to those obtained with the usual agents.

A still further object of the invention is to devise a starch converting process in which a conversion permitting highly successful fermentation is effected with a quantity of malt diastase considerably smaller than that necessary in known processes of this type.

According to my invention, these objects are accomplished and new relatively inexpensive and highly efficient fermentation stimulating agents are prepared by mixing with ground malt between about 10% and 70% unmalted raw finely ground millet of any type. The malt and the millet may be ground separately and the pulverized materials may be mixed, or malt and millet may be mixed before grinding and then be ground together. I prefer to use malts which are rich in diastase as components in the malt-millet mixtures constituting my new agent.

Up to 10%, preferably light colored, malt sprouts, as obtained by cautious drying, may be added to the malt-millet mixture before or after grinding. In the latter case, the sprouts are ground and then admixed to the preparation.

The new preparation may be added to the starch containing material to be converted in the same manner and in substantially the same quantities as the previously known conversion agents which consisted exclusively of malt or diastase containing malt products.

The following example may serve to illustrate the invention without limiting it.

EXAMPLE

A mixture was prepared containing the following components:

| | Per cent |
|---|---|
| Ground malt (diastase content 175° Lintner) | 50 |
| Ground malt sprouts | 10 |
| Raw ground millet | 40 |
| | 100 |

Although this mixture contained, of course, considerably less diastase per weight unit than the malt alone, its properties as a starch converting agent for yeast fermentation purposes proved to be superior to those of a pure malt having a diastase content of 175° Lintner (old method), as shown by the following experiments.

EXPERIMENT 1.—*Alcohol production*

Two parallel tests were conducted in exactly the same way as follows:

Two weighed portions of commercial white corn grits were gelatinized by cooking in two mash beakers designated I and II, respectively. After cooling 2% of distiller's malt having a diastase content of 175° Lintner was added to beaker I and 2% of the mixture according to the above described example was added to beaker II. Both beakers were kept at 50° C. until liquefaction of the starch occurred. Then, 8% more of the same distillers's malt were added to beaker I and 8% more of the mixture according to the example were added to beaker II. Conversion was effected at 55° C. and the mashes were finished off at 65° C. After cooling and mashing to a definite weight by mixing with water, both worts were fermented for 72 hours at 25-30° C. with equal amounts of the same distiller's yeast. After fermentation, the alcoholic content of each wort was determined and the physical characteristics of the alcohol recovered from an all-glass distilling apparatus were noted. The following observations were made regarding the process and its products:

(1) During the starch liquefaction and mashing phases, no appreciable difference was observed in the behavior of the parallel mashes.

(2) During the fermentation phase, the mash containing the agent according to the example showed more vigorous fermentation. Apparently, there was greater yeast stimulation than in the control mash.

(3) The yield of alcohol from the same amount of corn grits was greater when the agent according to the example was used instead of distiller's malt having a diastase content of 175° Lintner, as shown by the following figures:

|  | With agent according to example | With distiller's malt |
|---|---|---|
| Yield of alcohol per 100 gr. grits__grams__ | 30.34 | 29.02 |
| Yield of absolute alcohol per ton of grits_____gallons__ | 92.3 | 88.4 |

This shows that the yield of absolute alcohol per ton of grits was increased by 3.9 gallons or 4.4% when the new agent according to the example was substituted for the usual distiller's malt.

(4) The quality of the alcohol produced with the agent according to the example, as judged by odor and taste, was in no way inferior to that of the alcohol produced with distiller's malt.

EXPERIMENT 2.—*Bread baking*

Two breads were baked under the same conditions from two substantially equal doughs. One of said doughs contained as fermentation stimulating agent the usual spray dried malt, the other dough was made with the agent according to the example. The finished breads were scored in accordance with the scoring system of the "Bakers' Weekly," New York.

The compositions used, the process and the scoring results were as follows:

|  | Bread made with agent according to Example | Bread made with malt |
|---|---|---|
| Formula: |  |  |
| Flour_____grams__ | 1000 | 1000 |
| Water_____do__ | 730 | 730 |
| Milk powder_____do__ | 60 | 60 |
| Salt_____do__ | 20 | 20 |
| Sugar_____do__ | 60 | 60 |
| Agent according to Example_____do__ | 5 |  |
| Malt_____do__ |  | 5 |
| Shortening_____do__ | 40 | 40 |
| Yeast_____do__ | 25 | 25 |
| Yeast food_____do__ | 5 | 5 |
| Process: |  |  |
| Temperature_____°F__ | 82 | 82 |
| Made | 11:25 | 11:10 |
| 1st punch | 1:10 | 1:00 |
| 2nd punch | 2:05 | 1:55 |
| Moulded | 2:25 | 2:15 |
| Into oven | 3:15 | 3:05 |
| Out of oven | 3:45 | 3:35 |
| Bread score: |  |  |
| Symmetry | 4.37 | 4.37 |
| Bloom | 4.37 | 4.37 |
| Color of crust | 4.37 | 4.37 |
| Volume | 4.54 | 4.37 |
| Consistency of crust | 4.37 | 4.37 |
| Color of crumb | 8.44 | 8.75 |
| Grain | 8.75 | 8.75 |
| Texture | 13.13 | 13.13 |
| Aroma | 8.75 | 8.75 |
| Flavor | 18.12 | 17.52 |
| Eating quality | 8.75 | 8.75 |
| Total score | 87.96 | 87.50 |
| pH value | 5.51 | 5.48 |

As seen from the score, the color of crumb was slightly deficient in the bread made with the agent according to the invention, while its volume and flavor were slightly superior, which gave the finished bread made with the new agent a total score of 87.96 against 87.50 for the bread made with the usual malt.

What I claim is:

1. A starch converting agent, consisting of an intimate mixture of about 10 to 70% unmalted raw finely ground millet, 0 to 10% ground malt sprouts, and the rest ground malt.

2. A starch converting agent, consisting of an intimate mixture of 50% ground malt, 10% ground malt sprouts and 40% unmalted raw finely ground millet.

3. A process for converting starch containing material for subsequent yeast fermentation, comprising the step of converting the starch containing material by the addition of between about 1% and 7% of unmalted raw finely ground millet and between about 2% and 9% of ground malt.

ERICH BRIESS.